July 11, 1950 L. E. KUEBLER 2,514,956
GAUGE PLUG AND RESILIENT HOLDER
Filed April 26, 1946
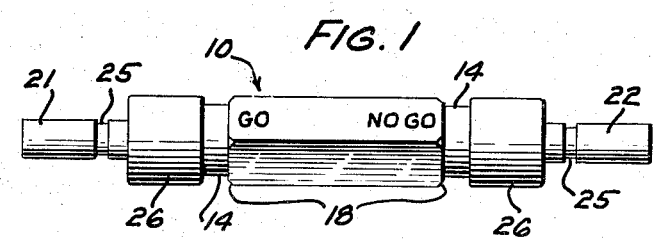
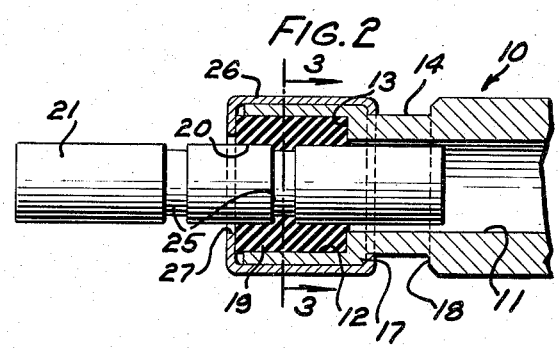
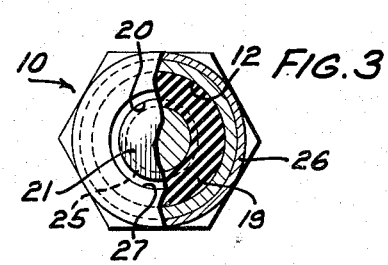
INVENTOR
L. E. KUEBLER
BY
ATTORNEY Patented July 11, 1950

2,514,956

UNITED STATES PATENT OFFICE 2,514,956

GAUGE PLUG AND RESILIENT HOLDER

Louis E. Kuebler, Berwyn, Ill., assignor to Western Electric Company, Incorporated, New York, N. Y., a corporation of New York Application April 26, 1946, Serial No. 665,062

1 Claim. (Cl. 33—178)

This invention relates to gauges and more particularly to a combined plug gauge and handle.

An object of the present invention is the provision of a simple and practicable combined plug gauge and handle which permits an unskilled operator to gauge efficiently without causing excessive wear or injury to the gauge.

In accordance with the above object, in one embodiment of the invention, particularly designed for use in gauging the diameters of circular apertures, there is provided a hollow handle having rubber bushings snugly fitted into enlarged shouldered portions at the opposite ends of the bore of the handle, the bores of the bushings being suitably smaller in diameter than that of straight double-ended plug gauge elements of "Go" and "No Go" diameters inserted thereinto so that the gauge elements will be frictionally gripped by the rubber bushings and provide a yieldable and universal mounting therefor. To provide greater resistance to movement of the gauge elements relative to the handle in a longitudinal direction, each gauge element is annularly recessed at two spaced portions whereby the rubber of the bushings will be forced into the recesses of the inserted ends of the gauge elements. Surrounding and secured to each end of the handle, which is externally shouldered, is a ferrule having its inner end spun over the shoulder on the handle, outer partially closed ends of the ferrules being effective to retain the rubber bushings in place without the ferrules engaging the gauging elements, and permitting yielding of the gauge elements on the handle in use.

Other objects and advantages of this invention will more fully apear from the following detailed description, taken in conjunction with the accompanying drawing, in which:

Fig. 1 is a side elevational view of a plug gauge embodying the features of the invention;

Fig. 2 is a longitudinal central sectional view on an enlarged scale of one end of the plug gauge shown in Fig. 1; and Fig. 3 is a vertical sectional view, partly in elevation, taken on the line 3—3 of Fig. 2.

Referring now to the drawing in detail, 10 indicates in general a handle having an axial bore 11 terminating at each end in an enlarged bore 12 providing an internal annular shoulder 13, the outer contour of the ends being circular. Adjacent each end of the handle 10, there is an annular external recess 14 providing annular shoulders 17 and 18. Between the shoulders 18—18, the handle 10 is of the usual, hexagonal shape upon its outer periphery to provide a hand grip. Snugly fitted within each of the enlarged bores 12 is a bushing 19 of resilient rubber or other equivalent material having an aperture 20, which is normally smaller than the diameter of double-ended gauging elements 21 and 22 and is inserted in the bore against the shoulders 13. When fully inserted, the outer end of the bushing 19 preferably extends a slight distance outside the annular end face of the handle. The gauging elements 21 and 22 are each formed with a pair of spaced annular recesses 25—25 so that when either end of a gauging element is inserted into the rubber bushing 19, it will be frictionally gripped by the rubber bushing and the rubber will flow into the innermost recess and thus provide greater resistance to movement of the gauging element relative to the handle 10 in a longitudinal direction.

To complete the mounting and securing of the gauging elements 21 and 22 and bushings 19 in the handle 10, a ferrule 26 is slipped onto the outer periphery of each end of the handle. The inner end of the ferrule 26, prior to placing it on the handle, is completely open and, after it is assembled on the handle, it is spun over the shoulder 17, as shown in Fig. 2, thus locking it to the handle. At its outer end, the ferrule 26 is partially closed and extends over the annular end face of the bushing, thus locking the latter to the handle, and providing an aperture 27 which is suitably greater in diameter than that of the gauging elements 21 and 22 so that each gauging element may yieldably move on its rubber bushing 19 with a universal action and without engaging the ferrule 26 or the handle 10. It will be noted that the diameter of the bore 11 of the handle 10, into which the inner end of the gauging element extends, is suitably greater than the diameter of the gauging element so that the inner end of the gauging element will not engage the handle during movement of the gauging element about its yieldable mounting while inserting the gauging element in an aperture, the diameter of which is being gauged.

From the foregoing description, it will be apparent that a simple and practicable plug gauge employing straight double-ended gauging elements is provided in which the gauging elements, due to their being yieldably mounted on the handle, may be inserted in an aperture being gauged, without an accurate alignment therewith, by an unskilled operator, thus preventing excessive wear or injury to the gauging elements. Furthermore, with the described arrangement for mounting the gauging elements to the handle, no engagement of the gauging elements with the handle and ferrules may occur, thus preventing marring or scratching of the highly polished accurately ground surfaces of the gauging elements, which would occur if the elements were rigidly gripped to the handle and an unskilled operator attempted to insert the element in an aperture being gauged without accurately aligning the element with the aperture before inserting it therein.

What is claimed is:

A plug gauge comprising a movable gauging member having a groove, a rigid gripping handle for supporting said gauging member and having a peripheral groove and a counterbore providing a shouldered surface, a resilient member compressed into said handle counterbore in abutting engagement with said shouldered surface and extending into the groove in the gauging member to permit the use of different size gauges in the one handle, said resilient member extending outside an end face of said handle, and a locking ferrule having flanges, one flange extending into said groove in the handle and another flange engaging the portion of the resilient member extending outside said end face of said handle and having an opening larger than the portion of the gauge entering the handle to provide clearance to permit angular side movement of the gauging member with respect to the handle.

LOUIS E. KUEBLER.

REFERENCES CITED

The following references are of record in the file of this patent:

UNITED STATES PATENTS

| Number | Name | Date |
|---|---|---|
| 2,174,105 | Haury | Sept. 26, 1939 |
| 2,229,587 | Parker | Jan. 21, 1941 |
| 2,274,417 | Ratcher | Feb. 24, 1942 |
| 2,345,750 | Hohwart | Apr. 4, 1944 |
| 2,375,945 | Redmer | May 15, 1945 |

FOREIGN PATENTS

| Number | Country | Date |
|---|---|---|
| 234,142 | Switzerland | Dec. 16, 1944 |
| 548,215 | Great Britain | Sept. 20, 1942 |
| 793,430 | France | Mar. 10, 1936 |